US005493489A

United States Patent [19]
Tamaki et al.

[11] Patent Number: 5,493,489
[45] Date of Patent: Feb. 20, 1996

[54] METHOD AND APPARATUS FOR DEFINING ENTERPRISE INFORMATION FLOW

[75] Inventors: Masato Tamaki, Zushi; Yasuhiko Mizuno, Sakura, both of Japan

[73] Assignee: Hitachi, Ltd., Tokyo, Japan

[21] Appl. No.: 685,905

[22] Filed: Apr. 16, 1991

[30] Foreign Application Priority Data

Apr. 20, 1990 [JP] Japan ............................ 2-102957

[51] Int. Cl.$^6$ ............................................. G06F 17/60
[52] U.S. Cl. ........................................................ 364/401
[58] Field of Search .................................. 364/401, 402, 364/468

[56] References Cited

U.S. PATENT DOCUMENTS

| | | | |
|---|---|---|---|
| 4,827,423 | 5/1989 | Beasley et al. | 364/468 |
| 5,016,170 | 5/1991 | Pollalis et al. | 364/401 |

OTHER PUBLICATIONS

Nikkei Computer, Aug. 28, 1989, pp. 63–79. (Provided in Japanese).
"Strategic Structuring of Information System", Nikkei McGraw Hill, 1985, pp. 20–26. (Provided in Japanese).
"Lotus 1–2–3 Desktop Companion" by Greg Harvey ©1987, Printed by Haddon Craftsman, Sybex Inc.

*Primary Examiner*—Gail O. Hayes
*Assistant Examiner*—J. L. Hazard
*Attorney, Agent, or Firm*—Fay, Sharpe, Beall, Fagan, Minnich & McKee

[57] ABSTRACT

In a method and apparatus for defining an enterprise information flow, a matrix having crossed axes and comprising three elements, that is line application activities which are a series of application activities for manufacturing products and/or services in an enterprise, staff application activities which are a series of application activities for maintaining and controlling the manufacture of the products and/or services, and external organizations related to the accomplishment of the application activities of the enterprise is generated to permit visual display. A user inputs information to a framework of the displayed matrix so that information flows between the application activities and between the application activities and the external organizations are defined.

13 Claims, 23 Drawing Sheets

| 201 | 202 | 203 |
|---|---|---|
| AAA CO. LTD. | A 0 0 0 0 1 | I 0 0 0 0 1 |
| BBB CO. LTD. | A 0 0 0 0 2 | I 0 0 0 0 2 |
| CCC CO. LTD. | A 0 0 0 0 3 | I 0 0 0 0 3 |
| ⋮ | ⋮ | ⋮ |

1ST COL.
(NAME OF ENTERPRISE)

2ND COL.
(NAME OF APPLICATION ACTIVITY/EXTERNAL ORGANIZATION MANAGEMENT TABLE OF THE ENTERPRISE)

3RD COL.
(NAME OF INFORMATION SOURCE/USER DEFINITION TABLE OF THE ENTERPRISE)

FIG. 3

| 301 | | 302 |
|---|---|---|
| L | A | MANUFACTURE (MFG.) |
| L | A | SALES |
| S | A | MFG. PLAN |
| S | A | FINANCE CONTROL |
| E | O | BANK |
| E | O | CUSTOMER |
| ⋮ | | ⋮ |

1ST COL.
(TYPES OF LINE APPLICATION ACTIVITIES, STAFF APPLICATION ACTIVITIES AND EXTERNAL ORGANIZATIONS)

2ND COL.
(NAMES OF LINE APPLICATION ACTIVITIES STAFF APPLICATION ACTIVITIES AND EXTERNAL ORGANIZATIONS)

FIG. 4

| 401 | 402 | 403 |
|---|---|---|
| MANUFACTURES | SALES | MFG. PLAN |
| DISTRIBUTION | SALES | INVENTORY |
| DEVELOPMENT | TECHNOLOGY CONTROL | MFG. STANDARD |
| ACCOUNTING | BANK | MONEY RECEIPT/ PAYMENT CONTROL |
| ⋮ | ⋮ | ⋮ |

1ST COL.
(INFORMATION SOURCE)

2ND COL.
(INFORMATION USER)

3RD COL.
(INFORMATION FLOW BETWEEN INFORMATION SOURCE AND INFORMATION USER)

|  |  |  |  |  |  |  |  |  |  |  |
|---|---|---|---|---|---|---|---|---|---|---|
|  |  |  |  |  |  |  | SYSTEM INVEST. PLAN |  |  |  |
|  |  |  |  |  |  |  |  |  |  |  |
|  |  |  |  | PERSONNEL PLAN | TECH. INFO. |  |  |  |  |  |
|  |  |  | GEN. FACILI INVEST. PLAN |  | TECH. INTRO. DEV. PLAN | TECH. INFO. | PERSONNEL PLAN |  |  |  |
|  |  |  | GEN. FACILI INVEST. PLAN | FACILI. OPER. STATUS |  TECH. INTRO. PLAN | EVAL. OF MFG. PROCESS TECH. INFO. | PERSONNEL PLAN |  |  |  |
|  |  |  | FACILI. INVEST. PLAN |  | TECH. INTRO. PLAN | VENDER INST. INFO. | PERSONNEL PLAN |  |  |  |
|  |  |  | MFG. FACILI INVEST. PLAN | FACILI. OPER. STATUS |  | TECH. INFO. INST. OF PLAN WORK IMPRO | PERSONNEL PLAN |  |  |  |
|  |  |  | GEN. FACILI INVEST. PLAN |  SALES/PRO. ARTICLE/MEDIA MAN'T INFO. |  | TECH. INFO. | PERSONNEL PLAN |  |  |  |
|  |  |  | GEN. FACILI INVEST. PLAN |  |  | TECH. INFO. | PERSONNEL PLAN |  |  |  |
|  |  |  | DIST. FACILI INVEST. PLAN | FACILI. OPER. STATUS |  | TECH. INFO. | PERSONNEL PLAN |  |  |  |
|  |  |  | ⑫FACILITY INVEST PLAN | ⑬FACILITY ABILITY EVAL. | ⑭SALES PRO. MAT CONTROL | ⑮TECH DEVELOP PLAN | ⑯TECH MANAGE (MAN'T) | ⑰PERSONNEL PLAN MANAGE. | ⑱LABOR MANAGE. | ⑲IS MANAGE. |

FIG. 5C

| | | | | | | | | | | ㉙AFFIL. COMPANY MAN'T |
|---|---|---|---|---|---|---|---|---|---|---|
| | | | | | BUSINESS ACQ. MAN'T DATA | BUSINESS ACQ. MAN'T DATA | BUSINESS ACQ. MAN'T DATA | BUSINESS ACQ. MAN'T DATA | BUSINESS ACQ. MAN'T DATA | ㉘BUSINESS ACQU MAN'T |
| | | | | | | | CUST MAN'T DATA SALES HISTORY | MARKET TREND CUST TREND | | ㉗CUSTOMER MAN'T |
| | | | | | | | | MARKET TREND | | ㉖MARKET MAN'T |
| | INST RECE/PAY | | | | | REQ. DATA RECEIPT DATA | | | | ㉕ACCOUNT. |
| | | INST. OF CONTROL | INST. OF CONTROL | INST. OF CONTROL | INST. OF CONTROL | INST. OF CONTROL | INST. OF CONTROL | INST. OF CONTROL | | ㉔LOSS/PROFIT MAN'T |
| | | ACTIVITY BUDGET | ACTIVITY BUDGET | ACTIVITY BUDGET | | ACTIVITY BUDGET | ACTIVITY BUDGET | ACTIVITY BUDGET | ACTIVITY BUDGET | ㉓LOSS/PROFIT PLAN |
| | | | | | | | | | | ㉒FINANCE PLAN |
| | | | | | | | | | | ㉑FUND PLAN |
| | | | | | | | | | | ⑳ADMINI. |

FIG. 5D

| ⑫FACILITY INVEST PLAN | ⑬FACILITY ABILITY EVAL. | ⑭SALES PRO. MAT CONTROL | ⑮TECH DEVELOP PLAN | ⑯TECH MANAGE (MAN'T) | ⑰PERSONNEL PLAN MANAGE. | ⑱LABOR MANAGE. | ⑲I S MANAGE. |
|---|---|---|---|---|---|---|---|
| | FACILITY EQUIP. ABILITY | | | | | MANPOWER EVAL | |
| | | SALES PRO. ARTICLE/ MAN'T INFO. | | | | MAN POWER(M/P) EVAL | |
| | | | | | | | |
| | | | | | | | |
| | FACILITY EQUIP. ABILITY | | | | PERSONNEL PLAN | | SYSTEM INVEST. PLAN |
| | | | | | | | |

FIG. 5G

| ⑳ADMINI. | ㉑FUND PLAN | ㉒FINANCE PLAN | ㉓LOSS/ PROFIT PLAN | ㉔LOSS/ PROFIT MAN'T | ㉕ACCOUNT. | ㉖MARKET MAN'T | ㉗CUSTOMER MAN'T | ㉘BUSINESS ACQU MAN'T | ㉙AFFI. COMPANY MAN'T |
|---|---|---|---|---|---|---|---|---|---|
| | | | PROFIT PLAN BUDGET RANGE | | | MARKET TREND | | BUSINESS ACQU ABILITY | |
| | | | PROFIT PLAN BUDGET RANGE | | | MARKET TREND | CUSTOMER TREND | | |
| | | | | | | MARKET TREND | | | |
| | | | BUDGET RANGE | | | MARKET TREND | SALES HISTORY | | |
| | | | | | | | | | |
| | | | | | | | | | |

FIG. 5H

| | | | | | | | | | |
|---|---|---|---|---|---|---|---|---|---|
| | | | | | ACTUAL SALES PROM. EFFECT OF SALES PROM. | | | | |
| | | REQ. FOR TECH INTRO. | REQ. FOR TECH INTRO. | | | TECH. INFOR. | TECH. INFOR. | TECH. INFOR. | |
| | | NEW TECH INFOR. TECH. UTLI. STATUS (TUS) | MFG. STANDARD TECH. INFOR. TUS | RAW MAT. QUALITY TUS STA. | PRO. QUALITY PRODUCT EFFI. TUS | TECH. INFOR. | TECH. INFOR. | TECH. INFOR. | |
| | | REQ. FOR M/P PERSONNEL DATA | REQ. FOR M/P PERSONNEL DATA | REQ. FOR M/P PERSONNEL DATA | REQ. FOR M/P PERSONNEL DATA | REQ. FOR M/P PERSONNEL DATA | REQ. FOR M/P PERSONNEL DATA | REQ. FOR M/P PERSONNEL DATA | |
| | | LABOR DATA | LABOR DATA | LABOR DATA | LABOR DATA | LABOR DATA | LABOR DATA | LABOR DATA | |
| | | REQ. FOR I/S OPERATING STATUS | REQ. FOR I/S OPERATING STATUS | REQ. FOR I/S OPERATING STATUS | REQ. FOR I/S OPERATING STATUS | REQ. FOR I/S OPERATING STATUS | REQ. FOR I/S OPERATING STATUS | REQ. FOR I/S OPERATING STATUS | |
| | NEW TECH. INFORMATION | | | | | | | | |
| | | | | | | | | | |
| | | | | | | | | | |

FIG. 5 I

|  | 8 | 9 | 10 | 11 |
|---|---|---|---|---|
| ⑭ SALES PRO MAT CONTROL |  |  |  |  |
| ⑮ TECH DEVELOP. PLAN | PROD BUSINESS PLAN | SALES BUSINESS PLAN | PRODUCT. PLAN |  |
| ⑯ TECH MAN'T |  |  |  | PRODUCT EVAL. |
| ⑰ PERSONNEL PLAN MAN'T | PROD BUSINESS PLAN | SALES BUSINESS PLAN |  |  |
| ⑱ LABOR MAN'T |  |  |  |  |
| ⑲ INFORMATION SYSTEM (IS) MANAGE. | PROD BUSINE PLAN | SALES BUSINESS PLAN |  |  |
| ⑳ ADMINI. |  |  |  |  |
| ㉑ FUND PLAN |  |  |  |  |

FIG. 5J

|   | 21 | 22 | 23 | 24 | 25 | 26 | 27 | 28 | 29 |
|---|----|----|----|----|----|----|----|----|----|
| 14 |   |   |   |   |   | MARKET TREND | CUSTOMER TREND |   |   |
| 15 |   |   | BUDGET RANGE | ACTUAL MFG. COST |   |   |   |   |   |
| 16 |   |   |   |   |   |   |   |   |   |
| 17 |   |   | BUDGET RANGE | ACTUAL WORK |   |   |   |   |   |
| 18 |   |   | BUDGET RANGE | CONTROL INST. |   | MARKET TREND |   |   |   |
| 19 |   |   |   |   |   |   |   |   |   |
| 20 |   | FINANCE STATUS | LOSS/PROFIT PLAN |   |   |   |   |   |   |
| 21 |   |   |   |   |   |   |   |   |   |

FIG. 5L

| | 1 | 2 | 3 | 4 | 5 | 6 | 7 |
|---|---|---|---|---|---|---|---|
| | | | | | | | |
| | | | | | | | |
| | BUDGET REQUEST | MFG STANDARD BUDGET REQ. | | BUDGET REQUEST | BUDGET REQUEST | BUDGET REQUEST | BUDGET REQUEST |
| | | ESTIME PRIME COST | ACTUAL PROC. | ACTUAL PRIME ACTUAL MFG. | ACTUAL SALES | | |
| | EXPENSE DATA | EXPENSE DATA | DEBIT DATA EXPENSE DATA | EXPENSE DATA | DEBIT DATA EXPENSE DATA | EXPENSE DATA | EXPENSE DATA |
| | | | | | ACTUAL SALES | | |
| | | | ACTUAL TRANSA. RAW MAT. QUALITY | ACTUAL TRANSA. | ACTUAL TRANSA. | ACTUAL TRANSA. | ACTUAL TRANSA. |
| RECE/PAY DATA | | | | | | | |
| REQ. DATA | | | | | | | |

FIG. 5M

|  | PROD. BUSI-NESS PLAN (PROPOSAL) | PROD. BUSI-NESS PLAN (PROPOSAL) | PROD. BUSI-NESS PLAN (PROPOSAL) |  | PRODUCT EVAL. |  |  |
|---|---|---|---|---|---|---|---|
|  | | PROD. BUSI-NESS PLAN (PROPOSAL) | PRODUCT PLAN |  | | | |
|  | PROD. BUSINESS PLAN | SALES BUSINESS PLAN | | | | | |
| ㉒ FINANCE PLAN | ㉓ LOSS/ PROFIT PLAN | ㉔ LOSS/ PROFIT MAN'T | ㉕ ACCOUNT. | ㉖ MARKET MAN'T | ㉗ CUSTOMER MAN'T | ㉘ BUSINESS ACQU. MAN'T | ㉙ AFF. COMPANY MAN'T |

FIG. 5N

|  | FACILITY INVEST PLAN (PROPOSAL) |  | TECH. INTRO DEV PLAN (PROPOSAL) |  | PERSONNEL PLAN (PROPOSAL) |  | SYSTEM INVEST. PLAN |  |
|---|---|---|---|---|---|---|---|---|
| 22 |  |  |  |  |  |  |  |  |
| 23 | FACILITY INVEST PLAN |  | TECH. INTRO DEV PLAN |  | PERSONNEL PLAN |  | SYSTEM INVEST. PLAN |  |
| 24 |  |  |  |  |  | SALARY DATA |  |  |
| 25 |  |  |  |  |  |  |  |  |
| 26 |  |  |  |  |  |  |  |  |
| 27 |  |  |  |  |  |  |  |  |
| 28 |  |  |  |  |  |  |  |  |
| 29 |  |  |  |  |  |  |  |  |

FIG. 50

| | | | | | | | |
|---|---|---|---|---|---|---|---|
| FUND PLAN | | | LOSS/PROFIT PLAN | ACCOUNT DATA | | | SETTLEMENT INFO. |
| FUND PLAN | FINANCE STATUS | | LOSS/PROFIT PLAN | | | | |
| | | LOSS/PROFIT PLAN | | ACCOUNT DATA | | | |
| | FUND PROCU. OPER DATA | | | | | | |
| | | | | | | | |
| | | | | | SALES HISTORY | | |
| | | | | CREDIT COLLECTION STATUS | | | |
| | | | | DEBIT PAYMENT STATUS | | | |

FIG. 5P

METHOD AND APPARATUS FOR DEFINING ENTERPRISE INFORMATION FLOW

BACKGROUND OF THE INVENTION

The present invention relates to methods and apparatus for defining an information flow communicated between application activities of an enterprise and supporting planning of an enterprise information system, and more particularly to a method for defining an enterprise information flow suitable for defining all information necessary to the activities of the enterprise by studying communicated information for all combinations of vertical items and horizontal items on a matrix representation having all application activities and external organizations arranged in rows and columns.

In order to cope with severe environment change and enterprise competition, the structuring of an information system which is directly coupled to a business strategy, that is, a strategic information system (SIS) has been demanded by many enterprises. As a result, a need to the information system is complex such as the realization of an information system which really contributes to the business and the structuring of an information system as a business base, and the information system itself has become of large scale and complex.

Consequently, it is necessary to provide information which is conformable throughout the enterprise. In the development of the information system, it is important to make clear an overall system of the information system which the enterprise should have and establish a master plan which is directed to an overall optimization without waste and difficulty. In order to cope with future rapid expansion of the enterprise information system, it is necessary to structure the overall system and clearly define mutual relationships of elements. Methods for defining the overall architecture of the enterprise information system in order to meet such requirements have been proposed. For example, in the IBM business systems planning (BSP) method described in "Strategic Structuring of Information System" NIKKEI McGraw Hills, 1985, application activities called business processes are defined on a vertical axis of a definition chart matrix and information flowing between the applications called data classes is arranged on a horizontal axis in order to define the enterprise information system architecture. For each element at a crosspoint of the vertical item and the horizontal item on the matrix, an identifier C (composition) which indicates whether the application activity composes the information and an identifier U (utilization) which indicates whether it utilizes the information are entered. In this manner, it is made clear which application activity composes the particular information, and which application activity utilizes the particular information. As a result, the communication of information among the enterprise application activities is clarified.

In a Japanese periodical NIKKEI COMPUTER Aug. 28, 1989, pages 63–79, especially pages 66–67, a method for analyzing an information flow among items is disclosed, in which line application activities and staff application activities are arranged on a horizontal axis in a diagrammatic representation, external organizations and business resources are arranged on a vertical axis, and those axes are divided into the line application activities and the staff application activities and into the external organizations and the business resources. In this method, any information flowing between the application activity and the external organization can be defined.

However, in the BSP technique of the prior art, no attention is paid to the definition of the information flow between the application activity and the external organization or an information flow of the activity across a plurality of line and staff resources. In the BSP matrix chart, no consideration is paid to a quick observation of the information flow for a desired application activity.

In the method described in NIKKEI COMPUTER Aug. 28, 1989, no consideration is paid to define the information flow for any combination of the application activities and the external organizations. Further, no definition is made as to which one of the activity/ organization items on the vertical axis and the horizontal axis of the chart is a source and which one is a user.

SUMMARY OF THE INVENTION

It is an object of the present invention to provide a method for defining an enterprise information flow to efficiently define the information flow relating to enterprise activities with easiness of updating while overcoming the problems of the prior art, and an apparatus for implementing the method.

It is another object of the present invention to provide an enterprise information flow definition chart which is suitable to define substantially all information necessary for enterprise activities and enables quick observation of the information flow of the enterprise activities.

In order to achieve the above objects, in accordance with one feature of the present invention, the information flow relating to all application activities of an enterprise is defined by setting three elements, that is, line application activities which are a series of application activities for manufacturing products and/or services in the enterprise, staff application activities which are a series of application activities for maintaining and controlling the manufacture of the products and/or services, and external organizations related to the accomplishment of the application activities of the enterprise, on a vertical axis and a horizontal axis in a diagrammatic matrix representation, arranging the items of the external organizations at the ends of the axes, dividing the vertical axis and the horizontal axis into the line application activities and the staff application activities, and preparing a matrix in which one of the axes is an information source and the other is a user of the information. The matrix representation is displayed on display means as an input screen. An application activity corresponding to an information user or a name of information to be supplied to an external organization is entered from an application activity corresponding to an information source or the external organization to a column at a crosspoint of the corresponding item on the vertical axis of the matrix and the corresponding item on the horizontal axis. The name of information, the source of the information and the user are stored in storage means in the form of a table. The information is read from the storage means as required to print out a chart of the matrix which defines the information flows between the application activities and between the application activity and the external organization.

In accordance with another aspect of the present invention, the above table is read, a functional information relational chart which shows a relationship among information prepared by the application activity and the external organization and its user, and information to be used by the designated application activity and external organization and its source, for the designated application activity and external organization, and the chart is visually displayed.

Since the matrix having the axes comprising three elements, that is, the line application activities and the staff application activities of the enterprise and the external organizations related to the accomplishment of the application. Activities of the enterprise, crossed by the vertical axis and the horizontal axis is generated and displayed, the user can assume and define all information flows among any combinations of the application activities and the external organizations.

Since the external organizations are arranged at the ends of the axes or on outer most sides of the axes' crossings, the information flows of the line application activities and the staff application activities in the enterprise can be collectively arranged.

Since the vertical axis and the horizontal axis cross to divide the line application activities and the staff application activities, the line application activities and the staff application activities are displayed in opposing quadrants so that it can be easily viewed.

Since the crossing area of the external organization on the vertical axis and the external organization on the horizontal axis, that is, the ninth quadrant is blank, the information flow between the external organizations which the enterprise has no connection cannot be predefined.

For the two crossing axes, one is used as the information source and the other is used as the information user. Accordingly, a direction of the information flow between the application activities and between the external activity and the external organization can be represented.

The matrix is applied as the input image and the sets of the information sources, the information users and the information flowing therebetween are stored in the storage means in the form of a table. Accordingly, the functional information relational diagram which defines the input information and the output information for the application activities and the external organizations selected by the user can be automatically prepared by a program. Accordingly, the trouble in preparing the chart is eliminated and the missing of the information flows is prevented.

BRIEF DESCRIPTION OF THE DRAWINGS

FIG. 2 shows a diagram of a format of an enterprise table which manages a data table, in accordance with the present invention, FIG. 3 shows a format of an application activity/ external organization management table which manages the application activities and the external organization of an enterprise, FIG. 4 shows a format of an information source/ user definition table which manages the application activities and the external organization of an information source in an enterprise, the application activities and the external organizations of an information user, and the information flowing therebetween.

DESCRIPTION OF THE PREFERRED EMBODIMENTS

A method for defining an information flow relating to the application activities of an enterprise in accordance with one embodiment of the present invention is now explained in detail with reference to FIGS. 1 to 7.

FIG. 2 shows a format of an enterprise table which manages a data table in the present embodiment.

In FIG. 2, a first column 201 holds names of enterprise, a second column 202 holds names of application activities/ external organization management tables of the enterprises. It holds the names to uniquely identify an application activity/external organization management table (FIG. 3) stored in a data table storage file 3. A third column 203 holds names of information source/ user definition tables which manage information sources and information users for the information relating to the application activities and the external organizations of the enterprises. It holds names to uniquely identify the information source/user definition tables (FIG. 3) stored in the data table storage file 3.

In FIG. 3, a first column 301 holds codes to identify types of the application activities and the external organizations. In the present embodiment, LA (line activity) represents line application activities which are a series of application activities for manufacturing products and/or services in the enterprise, and SA (staff activity) represents staff application activities which are a series of application activities for maintaining and controlling the manufacture of the products and/or services in the enterprise. EO (external organization) represents external organizations which relate to the accomplishment of the application activities of the enterprise. A second column 302 holds names of specific line activities, staff activities and external organizations of the enterprise.

In FIG. 4, a first column 401 holds names of application activities and external organizations which are information sources. A second column 402 holds names of application activities and external organizations which are information users. A third column 403 holds names of information from the information sources to the information users.

Figure 7:
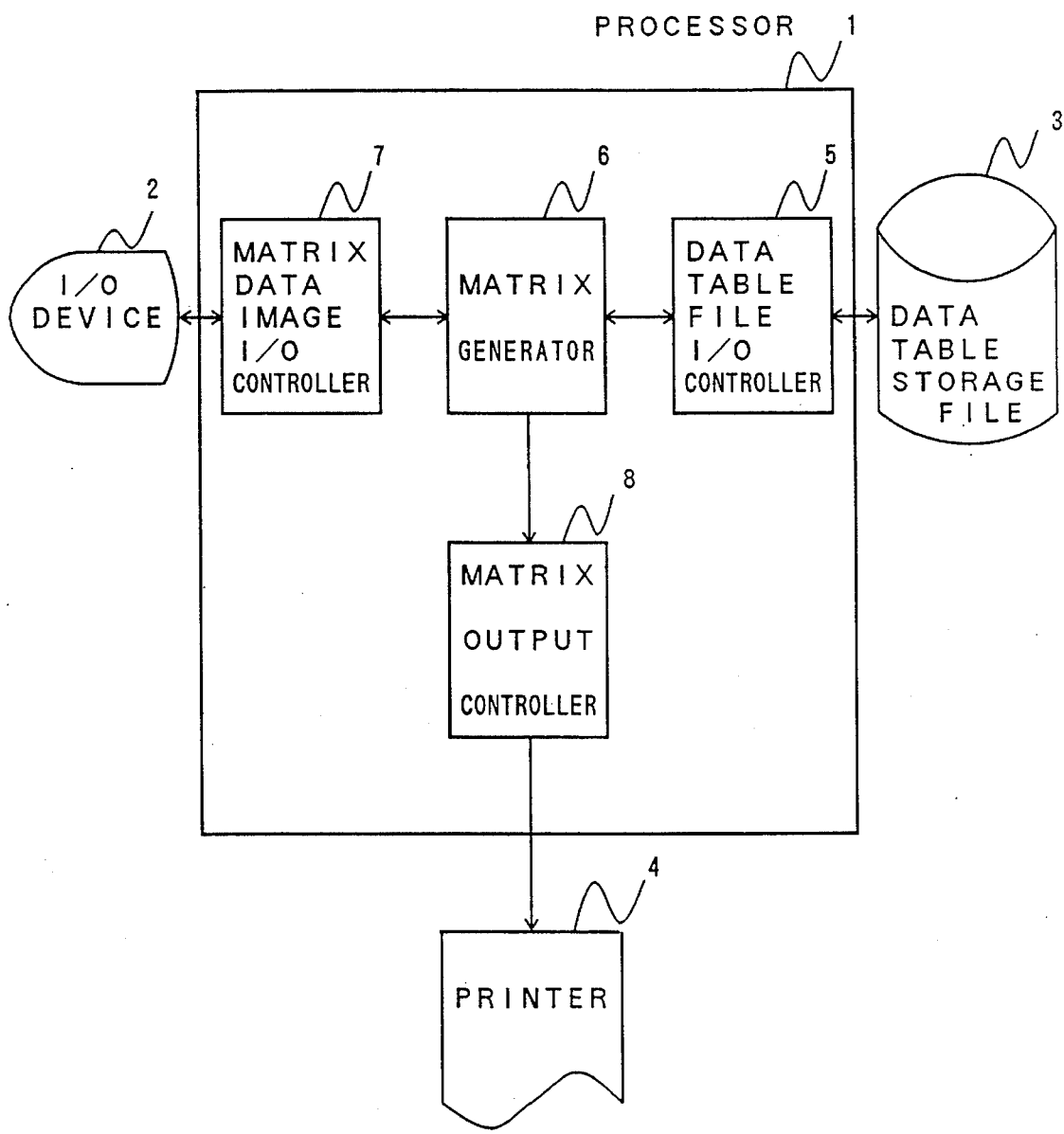
FIG. 7 shows a block diagram of a configuration of an enterprise information flow defining apparatus of the present invention.

FIG. 7 shows an enterprise information flow defining apparatus which embodies the present invention.

Figure 5A:
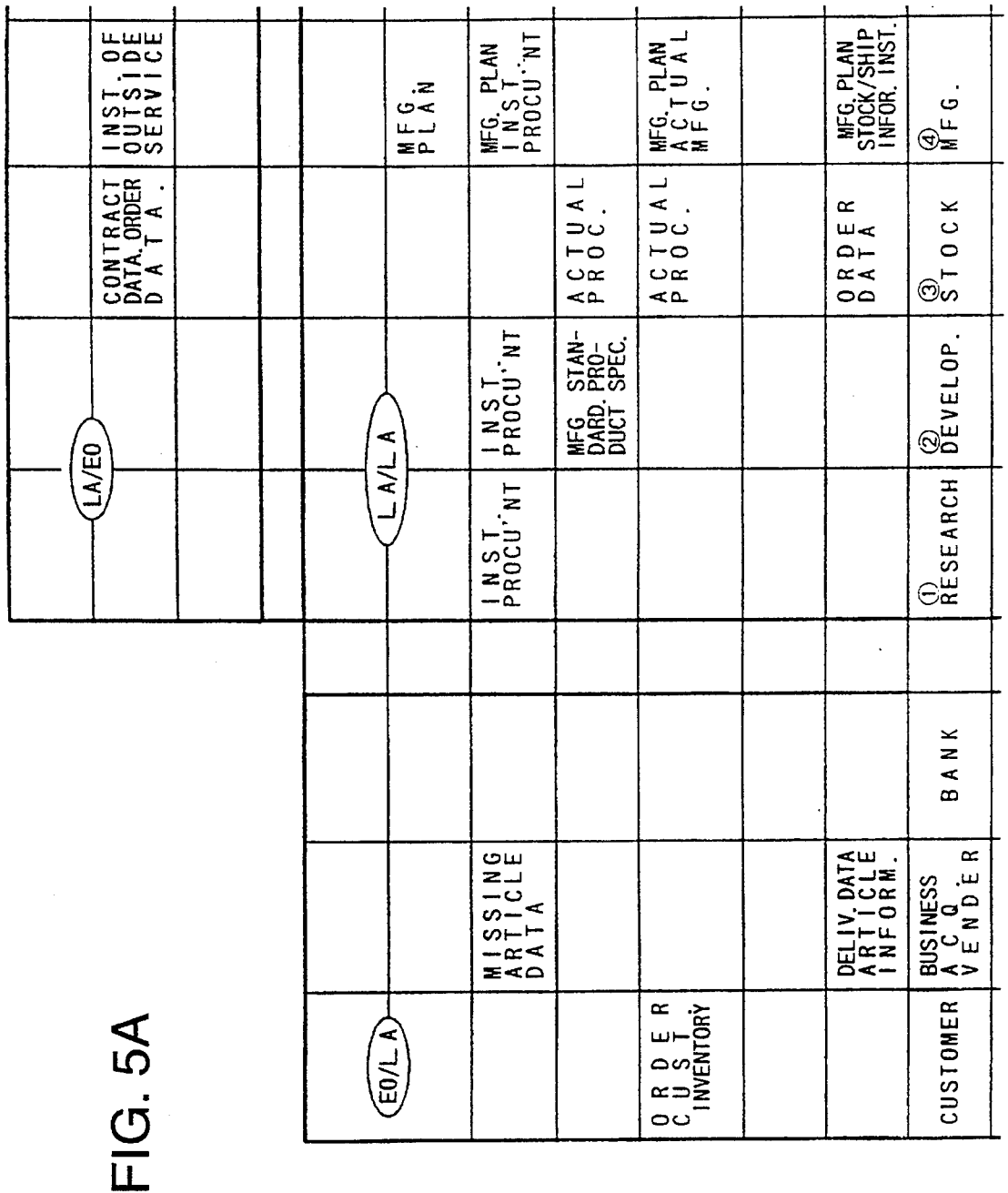
FIGS. 5A–5P show, in combination, an information flow definition/analysis matrix which defines information flowing between the application activities of an enterprise and between the application activities and the external organizations.
Figure 5B:
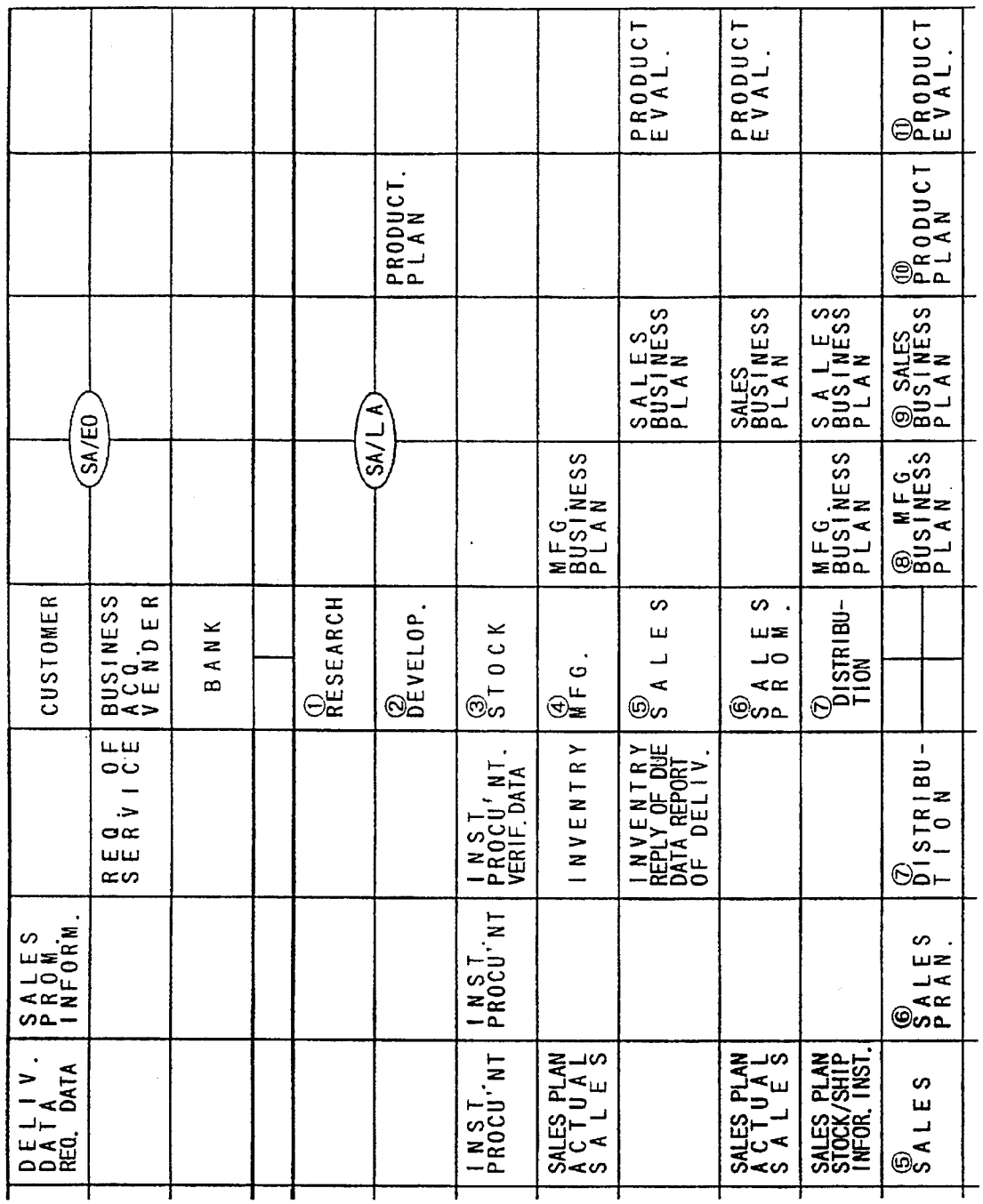
Figure 5E:
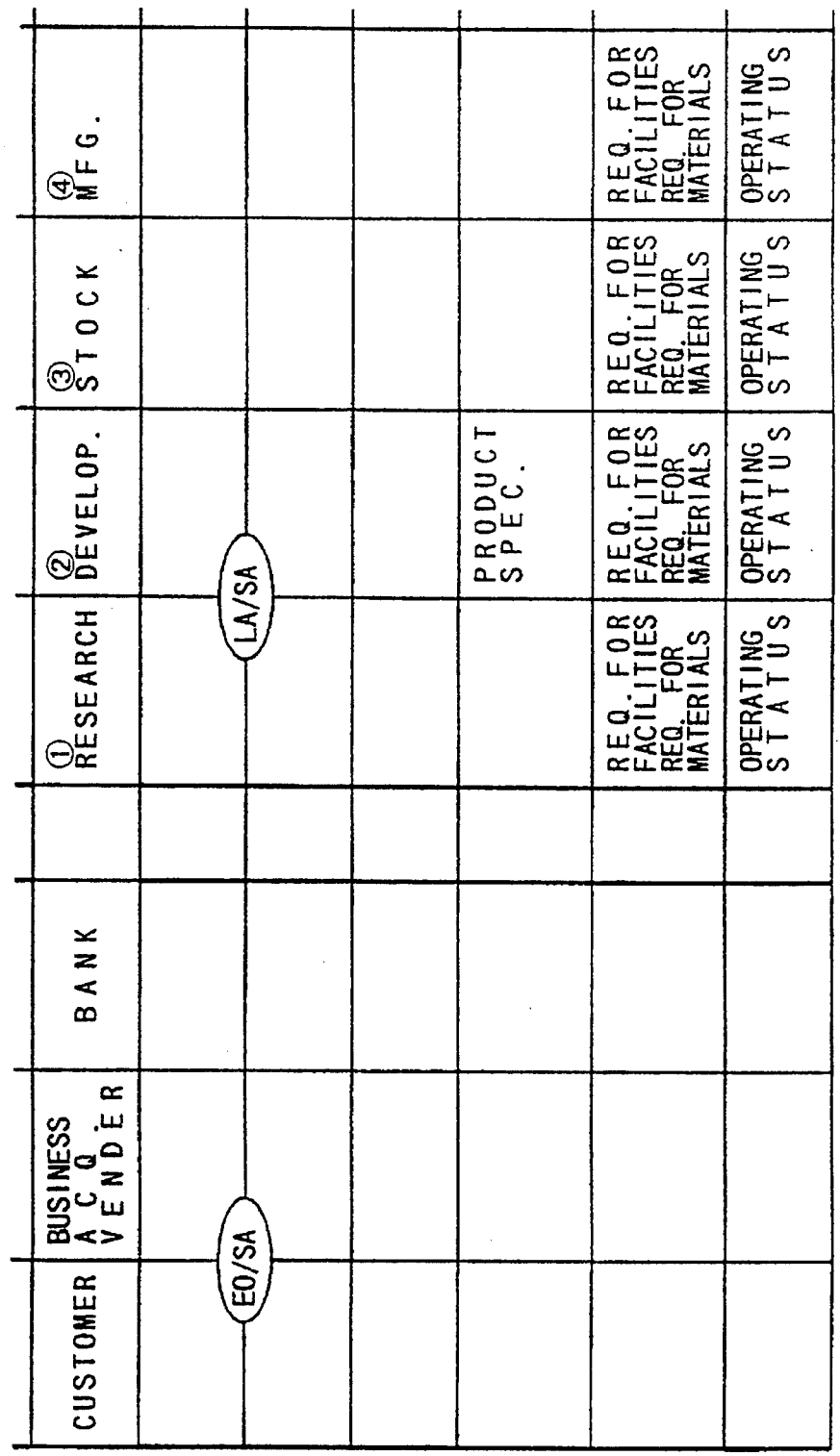
Figure 5F:
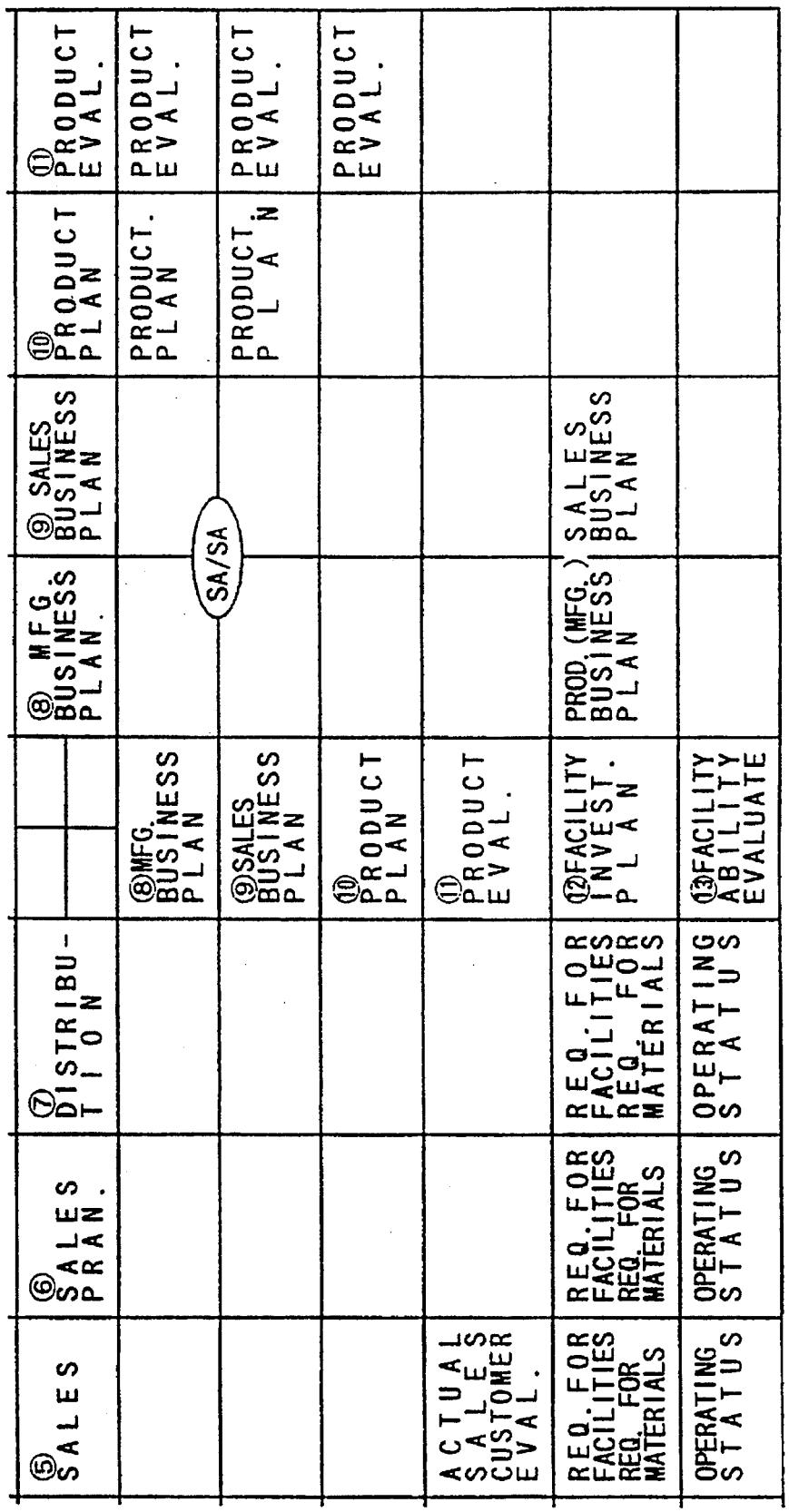
Figure 5K:
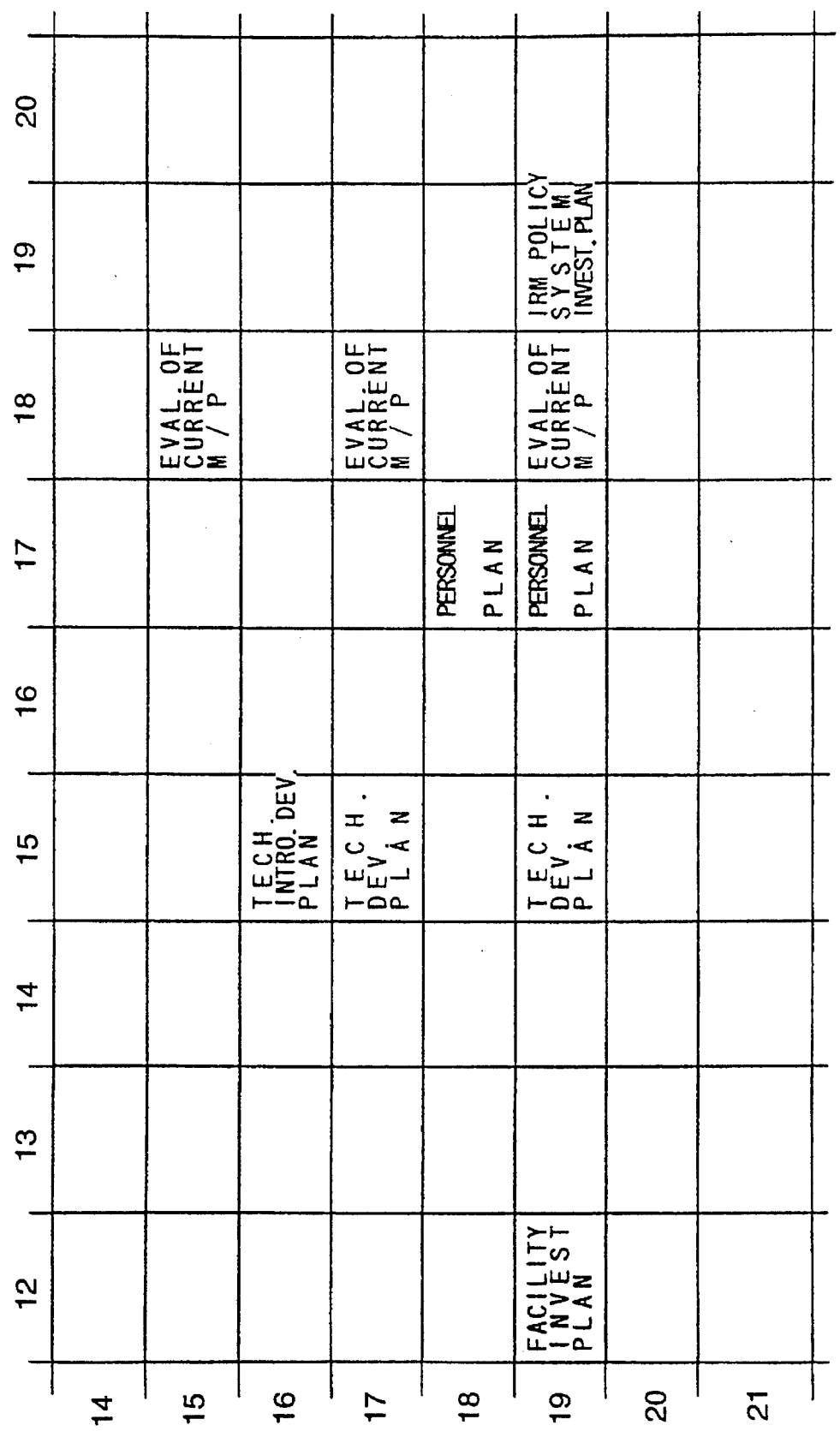
Figure 6A:
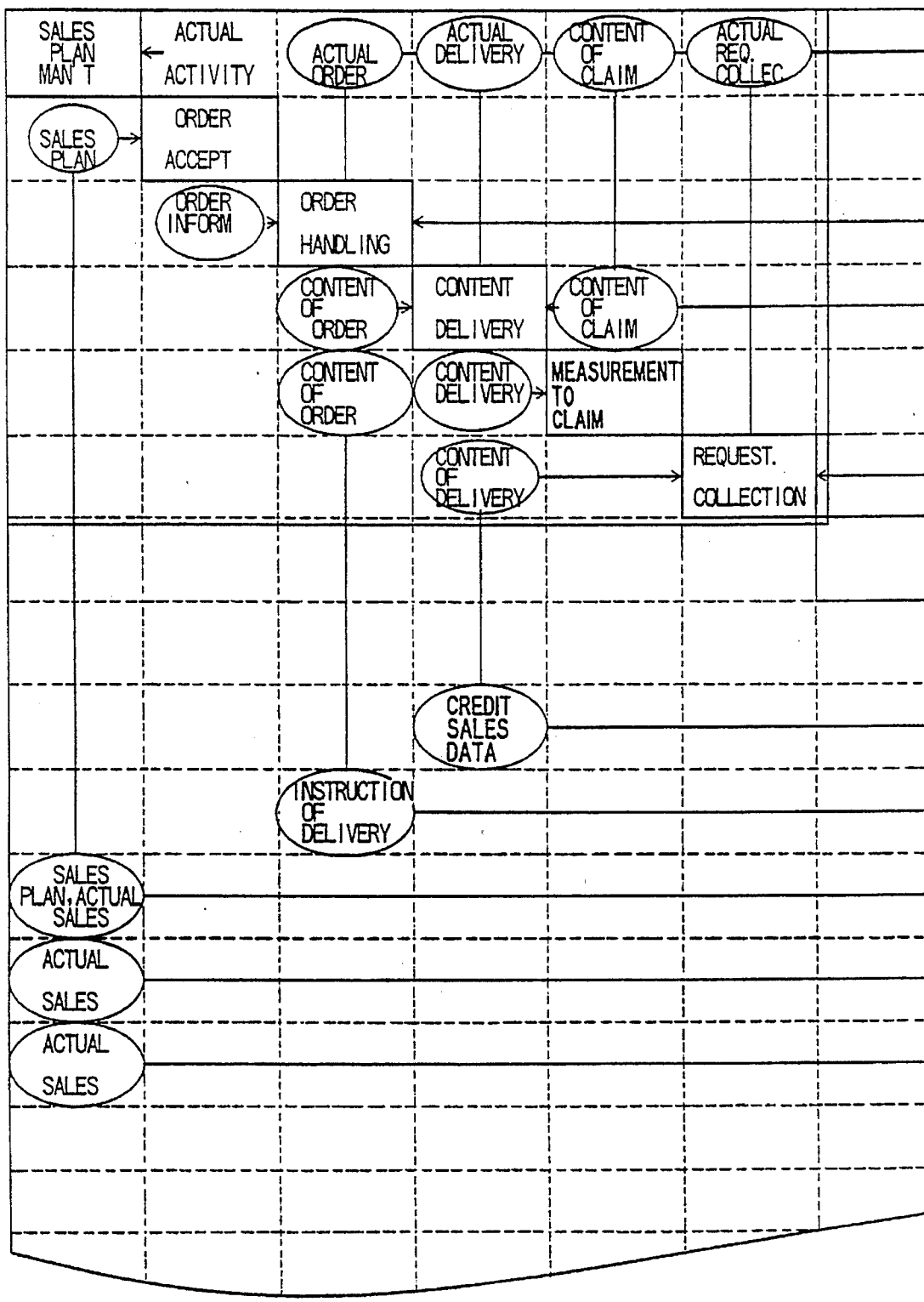
FIGS. 6A–6B show a functional information relational diagram which illustrates an information flow between designated application activity and external organization of the application activities and the external organizations of an enterprise.
Figure 6B:
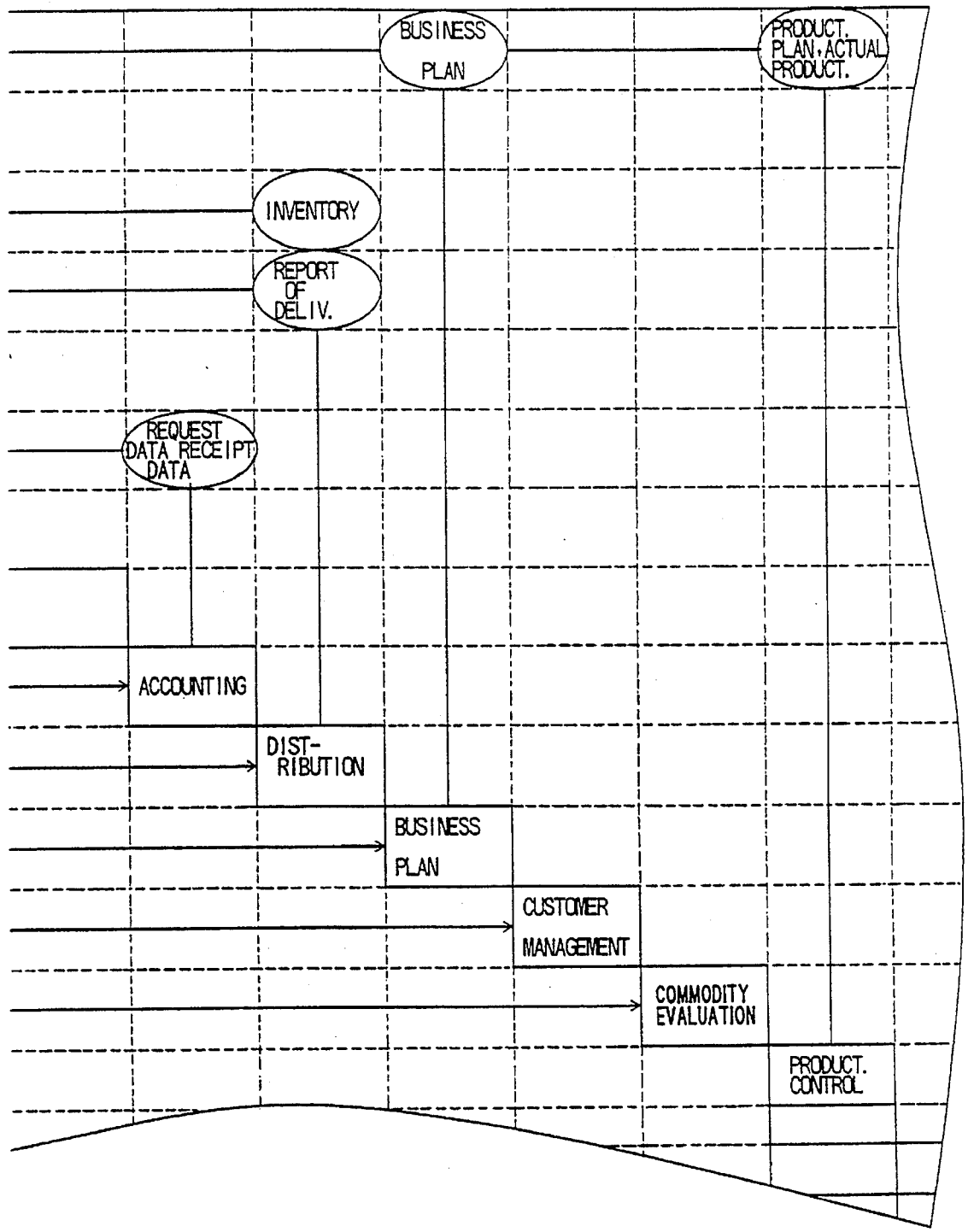

In FIG. 7, a numeral 1 (denotes a processor, numeral 2 denotes an input/output device including a keyboard, a pointing device and a display screen, numeral 3 denotes a data table storage file, numeral 4 denotes a printer, numeral 5 denotes a program-driven data table file input/output control portion or controller, numeral 6 denotes a program-driven matrix generating portion or generator, numeral 7 denotes a program-driven matrix data image input/output control portion or controller, and numeral 8 denotes a program-driven matrix output control portion or controller. The processor 1 processes the input/output operations of the data table with the data table storage file 3, the communication of the matrix data with the input (output device 2 and the output operation of the matrix data to the printer 4. The input/output device 2 displays the matrix data and processes the data input/output operation of the matrix. The data table storage file 3 stores an enterprise table (FIG. 2), application activity/external organization management table (FIG. 3) and an information source/user definition table (FIG. 4). The printer 4 prints out an information flow definition/analysis matrix (FIG. 5A–5P) and a functional information relational diagram (FIGS. 6A–6B). The data table file input/output controller 5 controls the input/output operation of the data tables (FIGS. 2, 3 and 4) with the data table storage file 3, and transfers the data tables (FIGS. 2, 3 and 4) with the matrix generator 6. The matrix generator 6 generates the information flow definition/analysis matrix (FIGS. 5A–5P) based on the data tables (FIGS. 2, 3 and 4) entered by the data table file input/output controller 5. The matrix generator 6 also inputs and outputs the information flow definition/ analysis matrix (FIGS. 5A–5P) to and from the matrix image input/output controller 7 and outputs the information flow definition/analysis matrix (FIGS. 5A–5P) to the matrix output controller 8. It also generates the functional information relational diagram (FIGS. 6A–6B) by a known generation program based on the information source/user definition table (FIG. 4) and outputs it to the matrix data image input/output controller 7 and the matrix output controller 8. The matrix data image input/output controller 7 outputs the information flow definition/analysis matrix (FIGS. 5A–5P) and the functional information relational diagram (FIGS. 6A–6B) supplied from the matrix generator 6 to the input/output device 2. It also sets the data supplied from the input/output device 2 to corresponding positions on the information flow definition/analysis matrix (FIGS. 5A–5P). The matrix output controller 8 outputs the information flow definition/analysis matrix (FIGS. 5A–5P) and the functional information relational diagram (FIGS. 6A–6B) supplied from the matrix generator 6 to the printer 4.

Figure 1A:
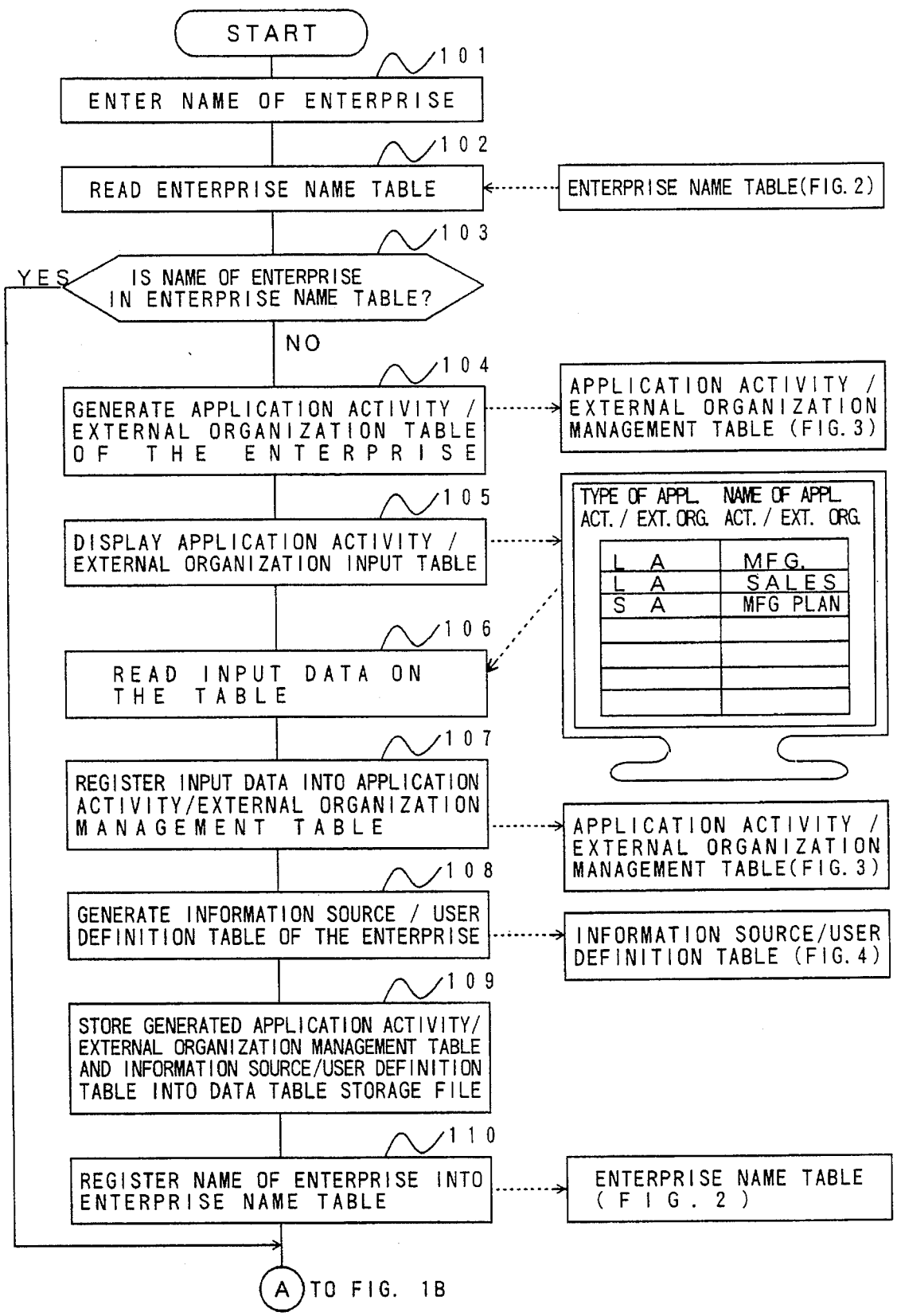
FIGS. 1A to 1C show flow charts of a process in one embodiment of an apparatus for supporting the analysis of an enterprise information flow in accordance with the present invention.
Figure 1B:
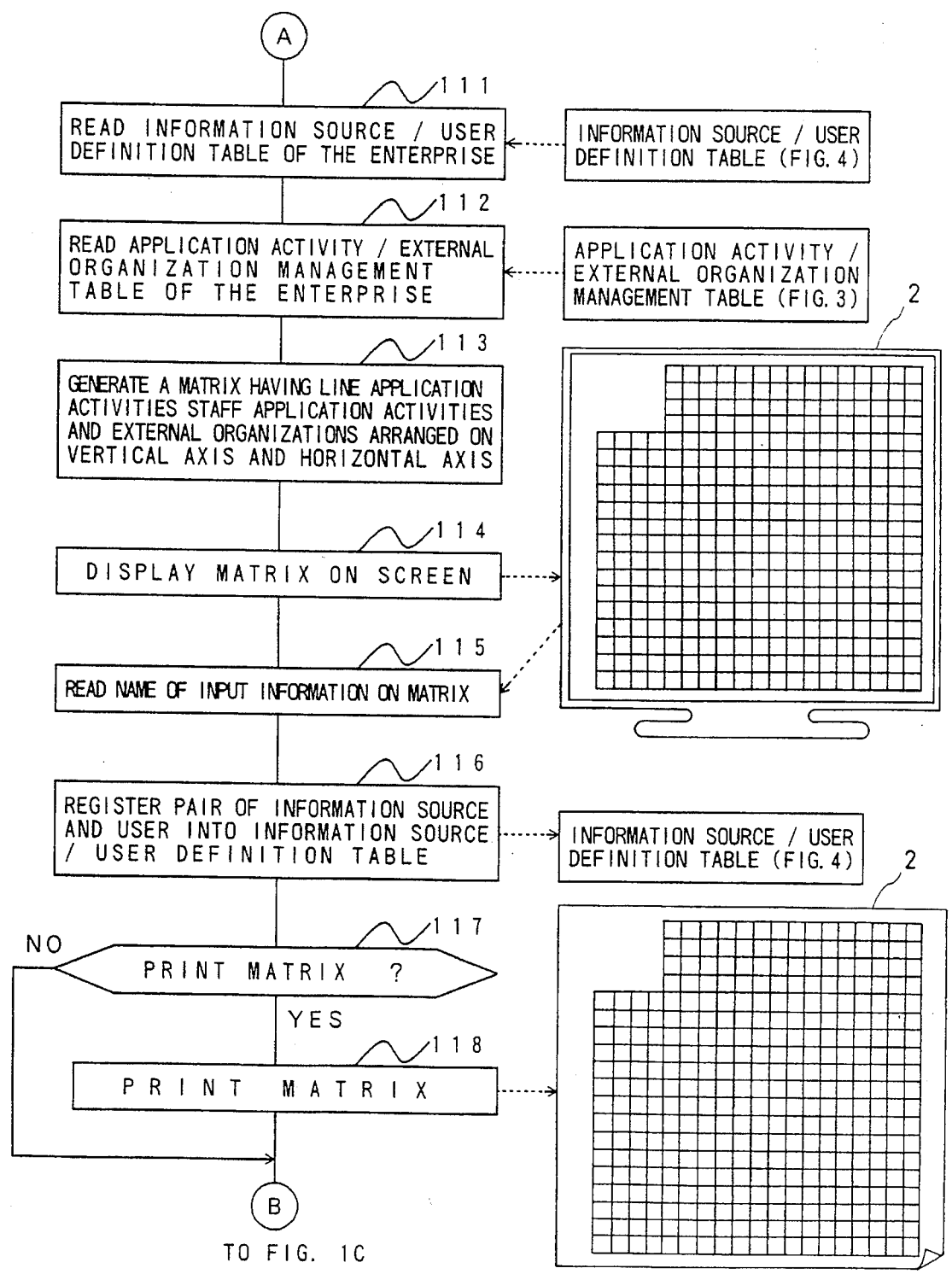
Figure 1C:
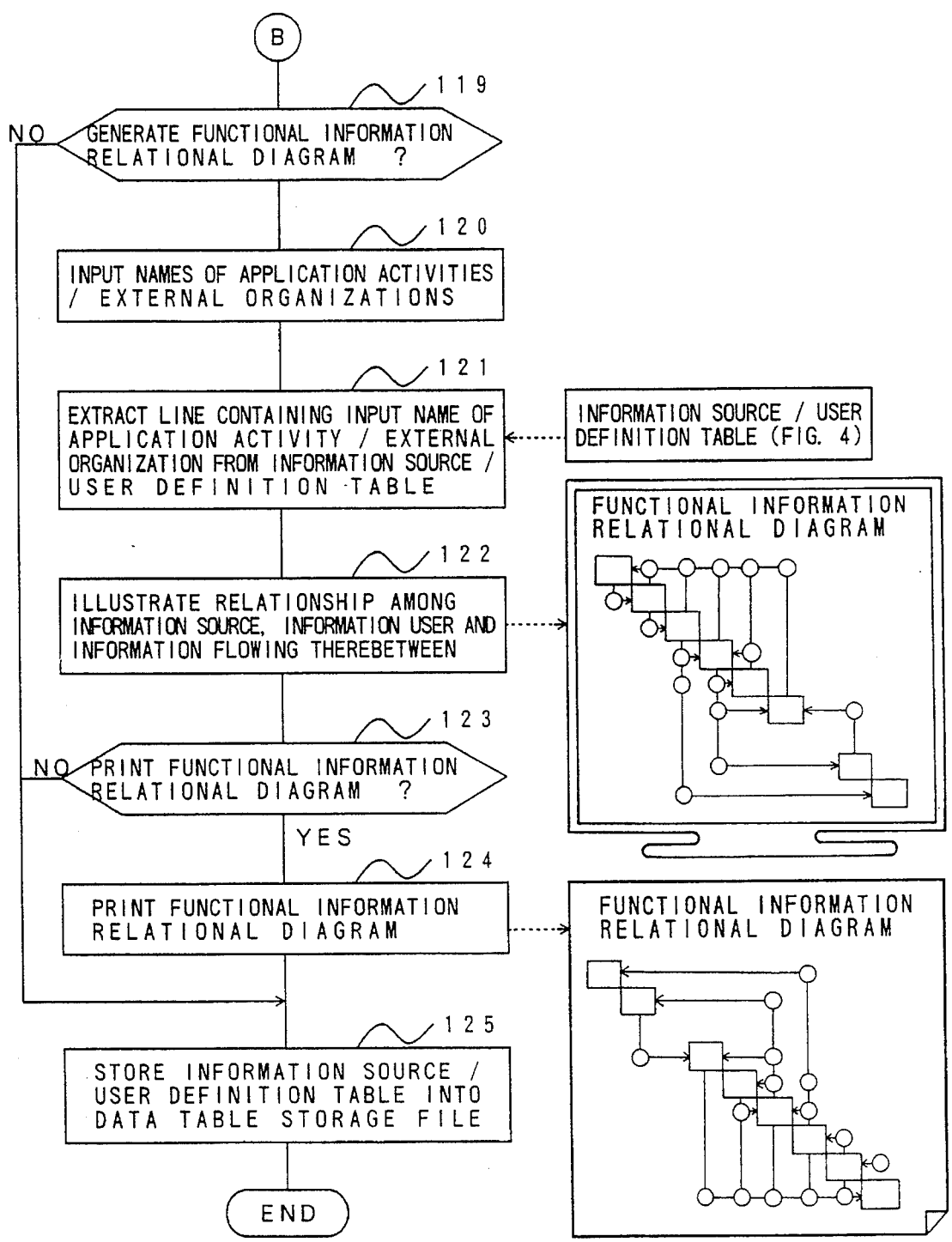

A process to generate the information flow definition/ analysis matrix (FIGS. 5A–5P) and the functional information relational diagram (FIGS. 6A–6B) by the matrix generator 6 is now explained with reference to the flow charts of FIGS. 1A–1C.

A name of enterprise to be defined and analyzed for the information flow is first entered by the input/output device 2 (step 101). The enterprise table (FIG. 2) is read from the data table storage file 3 (step 102). Whether the inputted enterprise exists in the first column 201 of the enterprise table (FIG. 2) or not is determined. If it exists, a step 111 is executed. If it does not exist, an application activity/external organization management table (FIG. 3) for that enterprise is prepared (step 104). The matrix generator 6 outputs the application activity/external organization management table (FIG. 3) to the input/output device 6 (step 105), inputs the application activities and the external organization of that enterprise to the table, and reads the input data (step 106). Then, the matrix generator 6 registers the input data into the application activity/external organization management table (FIG. 3) (step 107). Then, the information source/user definition table (FIG. 4) for that enterprise (step 108) is generated. Then, the generated application activity/ external organization management table (FIG. 3) and information source/user definition table (FIG. 4) are stored into the data table storage file 3 (step 109). Then, the name of the enterprise, the name of the application activity/external organization management table for the enterprise and the name of the information source/ user definition table for the enterprise are registered in the enterprise table (FIG. 2) (step 110). Then, the information source/user definition table (FIG. 4) for the enterprise is read from the data table storage file 3 (step 111). Then, the application activity/external organization management table (FIG. 3) for the enterprise is read from the data table storage file 3 (step 112). Then, the external organization, the line application activity and the staff application activity in the application activity/external organization management table (FIG. 3) are arranged, in this sequence, on the vertical axes from the top to the bottom, and on the horizontal axis from the left to the right to generate an information flow definition/analysis matrix (FIGS. 5A–5P) on a memory (step 113). The vertical axis and the horizontal axis on the matrix chart cross to divide the line application activities and the staff application activities. The matrix chart (FIGS. 5A–5P) is displayed on a display screen of the input/output device 2 (step 114). The user enters a name of information having the users including the external organization, the line application activity and the staff application activity arranged on the vertical axis, with the source including the external organization, the line application activity and the staff application activity arranged on the horizontal axis in the information flow definition/ analysis matrix (FIGS. 5A–5P) displayed on the screen, into a frame at the crosspoint of the item on the horizontal axis and an item on the vertical axis. The input name of information is written into the matrix generator 6 (step 115). Then, the information source/user definition table (FIG. 4) for the pair of information source and the information user of the information is registered (step 116). Then, whether the information flow definition/analysis matrix (FIGS. 5A–5P) is to be printed or not is determined (step 117), and if it is not to be printed, a step 119 is executed. If it is to be printed, the information flow definition/analysis matrix (FIGS. 5A–5P) is outputted to the printer 4 (step 118). Then, whether the functional information relational diagram (FIGS. 6A–6B) is to be generated or not is determined (step 119), and if it is not to be generated, a step 125 is executed. If the functional information relational diagram (FIGS. 6A–6B) is to be generated, the related application activity or external organization is inputted by the input/ output device 2 (step 120). A line which contains the external enterprise or the application activity entered into the first column 401 or the second column 402 of FIG. 4 is extracted (step 121). Then, the functional information relational diagram (FIGS. 6A–6B) which illustrates a relationship among the information source, the information user and the information flowing therebetween is generated and it is displayed by the input/output device 2 (step 122). Whether the functional information relational diagram (FIGS. 6A–6B) is to be printed or not is determined (step 123). If it is not to be printed, a step 125 is executed. If it is to be printed, the functional information relational diagram (FIGS. 6A–6B) is outputted to the printer 4 (step 124). Then, the information source/user table (FIG. 4) is stored into the data table storage file 3 (step 125).

In accordance with the present invention, since the framework which can define all application activities and external organizations relating to the enterprise activities and the information flowing therebetween are displayed, all information of the source and user of the application activities and the external organizations can be represented in a list and the information flows of the enterprise activities can be defined without missing.

What is claimed is:

1. A computer implemented method of displaying an enterprise information flow comprising the steps of:

displaying a display area on an output device in four quadrants formed by crossing vertical and horizontal axes;

assigning activity elements of both first and second enterprise activities in each of said vertical and horizontal axes, respectively, said first enterprise activity including line application activities which are a series of application activities which manufacture at least one of products and services in an enterprise, and said second enterprise activity including staff application activities which are a series of application activities which maintain and control the manufacture of the products and services;

acquiring into a storage means information flows established between said line application activities and said staff application activities, said information flows being inputted by a user; and displaying, by an output means, said acquired information flows in areas in which the activity elements on the vertical axes and the activity elements on the horizontal axes are crossed in one of said four quadrants.

2. The method of displaying an enterprise information flow according to claim 1 further comprising:

preparing elements defined by external organizations related to accomplishing the first and second enterprise activities;

arranging the elements for said external organizations at one end of each of the vertical and horizontal axes;

whereby information flows between the external organizations and the line application activities and information flows between the external organizations and the staff application activities are assigned to the four quadrants for display.

3. The method of displaying an enterprise information flow according to claim 1 wherein the activity elements defined in the horizontal axes are sources from which the information flows are generated and the activity elements defined in the vertical axes are destinations at which the information flows are utilized.

4. The method for displaying an enterprise information flow according to claim 1 further comprising defining a first axis of the vertical axis and the horizontal axis of said display area as a source of information flowing between the application activities or between the application activities and the external organizations, and defining a second axis as a user of the information.

5. The method for displaying an enterprise information flow according to claim 1 wherein said displaying a display area step includes a step of displaying said display area on a screen, and said acquiring step includes a step of inputting a name of information flowing between the application activities or between the application activities and the external organizations into a column at a crosspoint of the corresponding item on the vertical axis and the corresponding item of the horizontal axis.

6. A data processing apparatus for displaying an enterprise information flow comprising:

displaying means for displaying a display area in four quadrants formed by crossing vertical and horizontal axes;

assigning means for assigning activity elements of first and second enterprise activities in each of said vertical and horizontal axes, respectively, said first enterprise activity including line application activities which are a series of application activities which manufacture at least one of products and services in an enterprise, and said second enterprise activity including staff application activities which are a series of application activities which maintain and control the manufacture of the products and services;

acquiring means for acquiring information flows established between said line application activities and said staff application activities; and displaying means for displaying said acquired information flows in areas in which the activity elements on the vertical axes and the activity elements on the horizontal axes are crossed in one of said four quadrants.

7. An apparatus for defining an enterprise information flow according to claim 6 wherein said assigning means assigns information flow defining quadrants between the external organizations and the application activities in said vertical and horizontal axes at one end of the axes.

8. The apparatus for displaying an enterprise information flow according to claim 6 wherein the activity elements defined in the horizontal axes are sources from which the information flows are generated and the elements defined in the vertical axes are destinations at which the information flows are utilized.

9. The apparatus for displaying an enterprise information flow according to claim 6 wherein said assigning means assigns a first axis of the vertical axis and the horizontal axis of said display area as a source of information flowing between the application activities or between the application activities and the external organizations, and assigning a second axis as a user of the information.

10. The apparatus for displaying an enterprise information flow according to claim 6 wherein said displaying means includes means for displaying said display area on a screen, and said acquiring means includes program means for inputting a name of information flowing between the application activities or between the application activities and the external organizations into a column at a crosspoint of the corresponding item on the vertical axis of the matrix and the corresponding item of the horizontal axis.

11. The apparatus for displaying an enterprise information flow according to claim 6 further comprising storage means for receiving and storing information from the displaying means, the information comprising the display area as an input image, an information source and an information user, and means for reading the information from said storage means, and program-driven processing means for automatically generating a functional information relational diagram, using the information, for illustrating a relationship among designated application activities and external organizations, information prepared by the designated application activities and external organizations and the user thereof, and the information to be used by the designated application activities and the external organizations and the source thereof.

12. A computer implemented method for displaying an enterprise information flow to be interactively executed by a computer comprising the steps of:

displaying a display area in multiple quadrants formed by crossing vertical and horizontal axes;

designating the vertical axis and the horizontal axis to arrange, on the display area, names of line application activities which are a series of application activities which manufacture at least one of products and services in an enterprise, names of staff application activities which are a series of application activities which maintain and control the manufacture of the products and services, and names of external organizations related to the accomplishment of the activities of the enterprise;

arranging the names of line application activities and the names of external organizations, as viewed from a center axis defined at a crosspoint of the vertical axis and the horizontal axis, together sequentially along an ascending order of the vertical axis and a right-to-left direction of the horizontal axis and arranging the names of the staff application activities together sequentially along a descending order of the vertical axis and a left-to-right direction of the horizontal axis to form a matrix capable of defining an information flow; and inputting information for defining information flows between the application activities and between the application activities and the external organizations on the matrix, formed for each of the items of the line application activities, the staff application activities and the external organizations.

13. A computer implemented enterprise information flow format apparatus comprising a plurality of frames formed to arrange names of line application activities which are a series of application activities which manufacture at least one of products and services in an enterprise, names of staff application activities which are a series of application activities which maintain and control the manufacture of the products and services, and names of external organizations related to the accomplishment of the activities of the enterprise;

displaying means for producing a display area in multiple quadrants formed by crossing vertical and horizontal axes;

arranging means for arranging the names of line application activities and the names of external organizations, as viewed from a center axis defined at a crosspoint of the vertical axis and the horizontal axis, together sequentially along an ascending order of the vertical axis and a right-to-left direction of the horizontal axis and arranging the names of the staff application activities together sequentially along a descending order of the vertical axis and a left-to-right direction of the horizontal axis to form a matrix capable of defining an information flow; and each of said frames including a matrix for defining information flows between the application activities and between the application activities and the external organizations on the matrix, formed for each of the items of the line application activities, the staff application activities and the external organizations.

* * * * *